US008533565B2

(12) United States Patent
Miura et al.

(10) Patent No.: US 8,533,565 B2
(45) Date of Patent: Sep. 10, 2013

(54) CACHE CONTROLLER AND CACHE CONTROLLING METHOD

(75) Inventors: Takashi Miura, Kawasaki (JP); Iwao Yamazaki, Kawasaki (JP); Takahito Hirano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 402 days.

(21) Appl. No.: 12/654,442

(22) Filed: Dec. 18, 2009

(65) Prior Publication Data

US 2010/0107038 A1    Apr. 29, 2010

Related U.S. Application Data

(63) Continuation of application No. PCT/JP2007/062464, filed on Jun. 20, 2007.

(51) Int. Cl.
*G11C 29/00* (2006.01)

(52) U.S. Cl.
USPC ......................................................... 714/763

(58) Field of Classification Search
USPC ......................................................... 714/763
See application file for complete search history.

(56) References Cited

U.S. PATENT DOCUMENTS

| | | | | |
|---|---|---|---|---|
| 3,814,921 A | * | 6/1974 | Nibby et al. .................. | 714/764 |
| 5,058,116 A | | 10/1991 | Chao et al. | |
| 5,313,475 A | * | 5/1994 | Cromer et al. ................ | 714/758 |
| 6,366,984 B1 | * | 4/2002 | Carmean et al. .............. | 711/141 |
| 6,804,162 B1 | * | 10/2004 | Eldridge et al. ......... | 365/230.03 |
| 7,275,200 B2 | * | 9/2007 | Leung ........................... | 714/763 |
| 7,617,437 B2 | * | 11/2009 | Moyer .......................... | 714/763 |
| 7,836,262 B2 | * | 11/2010 | Gunna et al. .................. | 711/143 |
| 8,086,936 B2 | * | 12/2011 | Gower et al. ................. | 714/763 |
| 2002/0157056 A1 | * | 10/2002 | Chaudhry et al. ............. | 714/763 |
| 2003/0225980 A1 | * | 12/2003 | Henry et al. .................. | 711/144 |
| 2004/0003174 A1 | * | 1/2004 | Yamazaki ..................... | 711/118 |
| 2007/0044003 A1 | * | 2/2007 | Doweck et al. ............... | 714/763 |
| 2008/0235461 A1 | * | 9/2008 | Tan et al. ...................... | 711/146 |

(Continued)

FOREIGN PATENT DOCUMENTS

| | | |
|---|---|---|
| JP | 01-185753 | 7/1989 |
| JP | 03-108041 | 5/1991 |

(Continued)

OTHER PUBLICATIONS

Japanese Office Action for corresponding Japanese Application No. 2009-520204; issued on May 31, 2010.

(Continued)

*Primary Examiner* — Michael Maskulinski
*Assistant Examiner* — Neil Miles
(74) *Attorney, Agent, or Firm* — Staas & Halsey LLP

(57) ABSTRACT

A cache memory controlling unit includes a plurality of STBs for maintaining 8-byte store data received from an execution unit, a plurality of WBs, a DATA-RAM, an FCDR, and an ECC-RAM. The cache memory controlling unit having such a structure obtains data-not-to-be-stored from the DATA-RAM, stores the obtained data in the FCDR, and merges the stored data with data-to-be-stored in the store data output from the execution unit and stored in the STBs or the WBs to generate new store data. The cache memory controlling unit then writes the generated new store data in the DATA-RAM, generates an ECC from the new store data, and writes the ECC in the ECC-RAM.

6 Claims, 17 Drawing Sheets

(56) References Cited

U.S. PATENT DOCUMENTS

| | | |
|---|---|---|
| 2008/0294961 A1 | 11/2008 | Hirano |
| 2009/0024833 A1* | 1/2009 | Deneroff et al. ............... 712/29 |
| 2009/0031188 A1 | 1/2009 | Miura |

FOREIGN PATENT DOCUMENTS

| | | |
|---|---|---|
| JP | 06-119238 | 4/1994 |
| JP | 08-286977 | 11/1996 |
| JP | 09-134314 | 5/1997 |
| JP | 10-232789 | 9/1998 |
| JP | 2004-038341 | 2/2004 |
| JP | 2004-514184 | 5/2004 |
| WO | 01/13234 | 2/2001 |
| WO | 2007/088597 | 8/2007 |
| WO | 2007/094045 | 8/2007 |

OTHER PUBLICATIONS

International Search Report for corresponding International Application PCT/JP2007/062464; mailed Feb. 26, 2008.

Jin-Fu Li et al.; An Error Detection and Corection Scheme for RAMS with Partial-Write Function; XP010831402; ISBN:978-0-7695-2313-2; pp. 115-120, Aug. 5, 2005.

Extended European Search Report for corresponding European Application 07767302.8-1229; dated Dec. 3, 2010.

Jin-Fu Li et al.; An Error Detection and Correction Scheme for RAMS and Partial-Write Function; XP010831402; ISBN:978-0-7695-2313-2; pp. 115-120, Aug. 5, 2005.

* cited by examiner

●STORE BUFFER (STB)

●WRITE BUFFER (WB)

● FETCH DATA REGISTER (FCDR)

CACHE CONTROLLER AND CACHE CONTROLLING METHOD

CROSS-REFERENCE TO RELATED APPLICATION(S)

This application is a continuation of PCT international application Ser. No. PCT/JP2007/062464 filed on Jun. 20, 2007 which designates the United States, the entire contents of which are incorporated herein by reference.

FIELD

The embodiments discussed herein are directed to a cache controller, a cache controlling method, and a cache controlling program that perform a write operation to store data received from a execution unit, and generate an ECC for the store data.

BACKGROUND

Conventionally, a data cache memory (DATA-RAM) protects data by appending an Error-Check-and-Correction (ECC) byte to an 8-byte data. An ECC is stored in an ECC cache memory (ECC-RAM) that is separate from DATA-RAM, and dedicatedly provided for ECCs. The ECC-RAM is updated when a register or a write operation is performed to the cache memory.

A common method of generating an ECC will now be explained with reference to FIG. 17. As depicted FIG. 17, to write data into a cache memory, an instruction processor issues a store instruction to a memory processor. Upon receiving the instruction, the memory processor checks if the cache line to be stored is in the cache memory, and at the same time, reads the data in the cache line to be stored from the cache memory and checks the data for an error. At this time, store data issued from an execution unit and alike is written in a store buffer (STB).

When the instruction processor issues a store permission subsequently, the memory processor writes the data taken out from the store buffer into a write buffer (WB), and further writes the data taken out from the write buffer into the DATA-RAM. At the same time as writing the data, the memory processor generates an ECC based on 8-byte fetched data read from the DATA-RAM, using bytes-not-to-be-stored included therein (ECC generation 1). In addition, the memory processor generates an ECC based on data in the bytes-to-be-stored included in the 8-byte store data (ECC generation 2). The memory processor then merges these two ECCs to generate an ECC corresponding to the updated store data, and stores the generated ECC in the ECC-RAM.

However, a 1-bit error might be different in each of these scenarios, that is, in the data read from the DATA-RAM upon checking for an error when the retrieval access is made to the cache memory in response to the store request; and in the data read therefrom upon generating the ECC after the storing is permitted, and the cache memory is accessed for the write. In other words, if no error is detected at the error check performed upon the data retrieval, but an error is found in the data read upon execution of the write, the ECC corresponding to the data after the write cannot be generated properly. Furthermore, the ECC remaining at this point is one corresponding to the data before the write, and the data before the write has been already lost. Therefore, it is impossible to correct the faulty bit, further making it impossible to correct the 1-bit error upon reading the data before executing the write. The reason why such an uncorrectable error occurs is that, because the data is read from the DATA-RAM twice, the result of each of the reads might be different.

In response to such an issue, a disclosed technique executes an error check and an ECC generation based on a single read (see FIG. 18). In other words, the disclosed memory processor does not use the data read from DATA-RAM upon executing the write. More specifically, an ECC is generated based on the data stored previously, and the ECC is appended to the store data written in the STB, to generate new store data (see Japanese Laid-open Patent Publication No. 01-185753, Japanese Laid-open Patent Publication No. 03-108041, Japanese Laid-open Patent Publication No. 10-232789, and Japanese National Publication of International Patent Publication No. 2004-514184, for example).

However, these conventional techniques have a problem that, when data of equal to or less than 8 bytes are stored in the same address consecutively, Store-Store-Interlock (SSI) may occur, resulting in performance deterioration. More specifically, because a memory processor with such a structure maintains data-not-to-be-stored as an ECC, if the next store instruction executes a write in the same area as the preceding store instruction, the memory processor has to wait for the preceding storing to complete before generating an ECC. Therefore, the memory processor results in detecting SSI for store data other than 8-byte full-store data, thus fails to execute the next storing.

SUMMARY

According to an aspect of an embodiment of the invention, a cache memory controller includes a data detecting unit that detects a write address in the cache memory into which the store data is stored, an area-to-be-stored of the store data that is to be stored and an area-not-to-be-stored that is not to be stored, when the store data is transmitted from an execution unit; a data determining unit that determines whether data-to-be-stored that is already written is present in the write address detected by the data detecting unit; an existing data-not-to-be-stored obtaining unit that obtains, from the data written in the write address, data detected by the data detecting unit and written in the area-not-to-be-stored, as existing data-not-to-be-stored, when the data determining unit determines that the data-to-be-stored is present in the write address; a store data writing unit that merges the existing data-not-to-be-stored obtained by the existing data-not-to-be-stored obtaining unit with the data-to-be-stored in the area-to-be-stored detected by the data detecting unit to generate new store data, and writes the new store data into the write address detected by the data detecting unit; and an ECC generating unit that generates an ECC for the new store data written by the store data writing unit into the cache memory, from the new store data generated by the store data writing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited to the embodiment described below.

The explanations will be given in order of the overview and characteristics of a cache controlling unit according to the embodiments, and the structure of and processes performed by the cache controlling unit. Various variations of the embodiments will be explained last.

[a] First Embodiment

Overview and Characteristic of Cache Memory Controller

Figure 1:
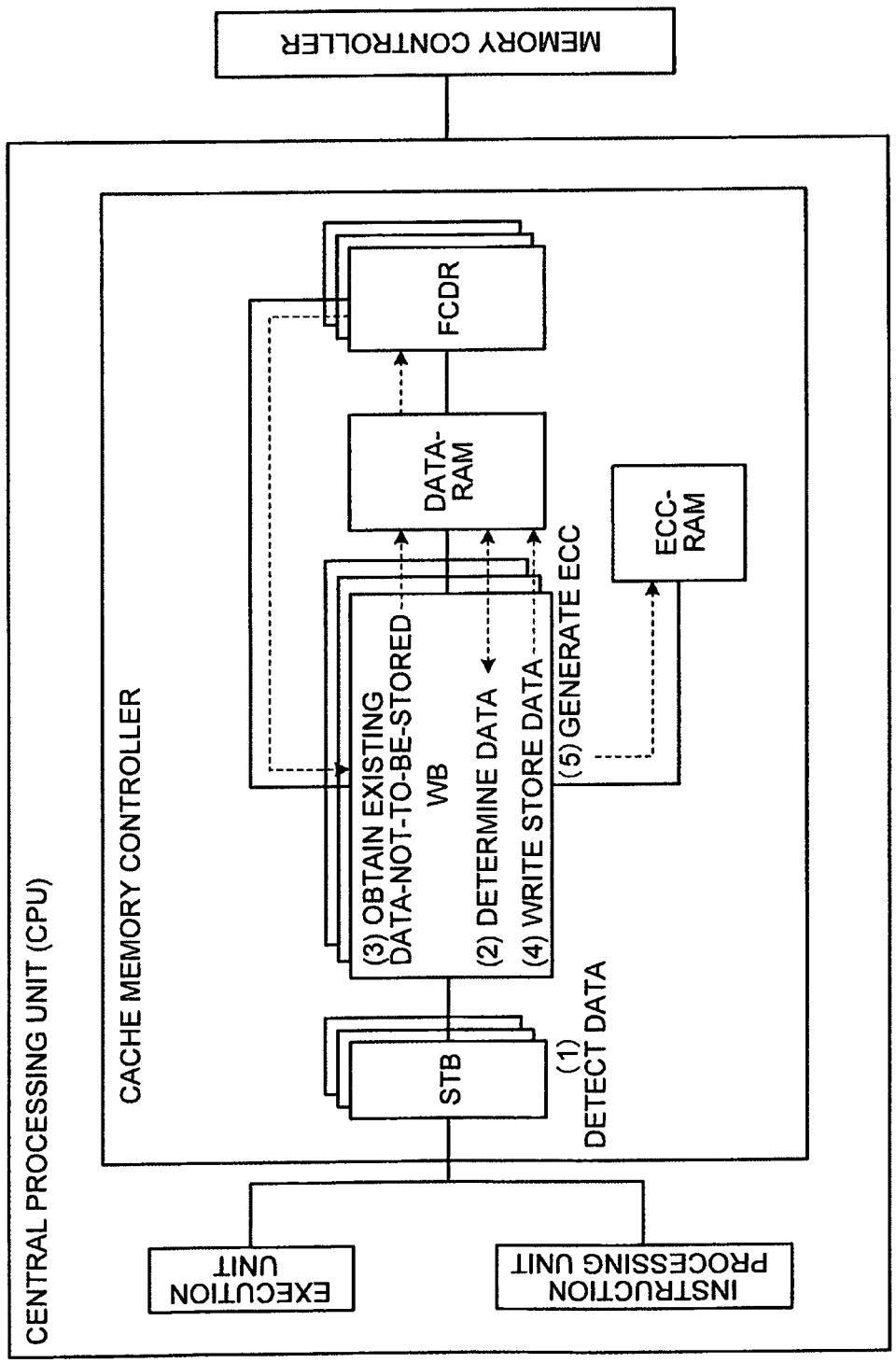
FIG. 1 is a schematic of a system structure depicting an entire structure of a cache memory controller according to a first embodiment of the present invention.

To begin with, an overview and a characteristic of a cache memory controller according to an embodiment of the present invention will be explained with reference to FIG. 1. FIG. 1 is a schematic of a system structure depicting an entire structure of the cache memory controller according to a first embodiment of the present invention.

As depicted in FIG. 1, this cache memory controller is connected to an execution unit and an instruction processing unit to realize a central processing unit (CPU or MPU). The central processing unit is connected to a memory controlling unit that reads or writes data from or to a main memory. The instruction processing unit connected to a cache memory controlling unit transmits a store instruction appended with store-related information such as a store address, a store data width, and aligning information to the cache memory controlling unit. The execution unit transmits 8-byte store data to the cache memory controlling unit.

The cache memory controlling unit includes: a plurality of store buffers (STB) that stores therein 8-byte store data transmitted by the execution unit; a plurality of write buffers (WB) that temporarily maintains the store data to be stored (to be written) in a DATA-RAM; the DATA-RAM that is a cache memory that stores therein 8-byte store data; a plurality of fetch data registers (FCDR) that maintains data output from the DATA-RAM; and an ECC-RAM that stores therein an ECC corresponding to 8-byte store data to be stored in the DATA-RAM.

Using such a structure, the cache memory controlling unit generally writes store data received from the execution unit onto the cache memory, as well as generating an ECC for the store data. Especially, a main characteristic of the cache memory controlling unit is in its capability of preventing SSI from occurring even when equal to or less than 8-byte data is stored consecutively to the same address, and of generating a correct ECC.

To explain this main characteristic more specifically, upon receiving store data from the execution unit, the cache memory controlling unit detects therein an address into which the store data is stored; an area-to-be-stored; and an area-not-to-be-stored that is not to be stored, from the store data (See Step (1) in FIG. 1). To use a specific example, let us assume that the execution unit transmits 8-byte store data having 6-byte data that is to be maintained (to be stored) in the DATA-RAM, and 2-byte data that is not to be maintained (not to be stored). In this scenario, the cache memory controlling unit detects, for example, an "address A" that is an address of the DATA-RAM in which the store data is to be stored; "6 bytes" that is an area-to-be-stored that is to be stored in the store data; and "2 bytes" that is an area-not-to-be-stored that is not to be stored. In addition, the cache memory controlling unit maintains the store data in the STB, and outputs the store data to the WB.

The cache memory controlling unit then determines if any other data written in the detected address of the cache memory is present (see Step (2) in FIG. 1). To explain more specifically with reference to the example, the cache memory controlling unit refers to the detected address "address A" in the DATA-RAM, and determines if other data is already written in the address (retrieves the cache).

If it is determined that other data is present in the address of the cache memory, the cache memory controlling unit obtains the data from the area-not-to-be-stored detected earlier in the data that is stored in the address, as existing data-not-to-be-stored (see Step (3) in FIG. 1). To explain more specifically with reference to the example, if it is determined that other data is present in the address "address A" of the DATA-RAM, that is, if a cache hit occurs, the cache memory controlling unit stores data in the detected "2-byte" area-not-to-be-stored, out of the data stored in the address, as existing data-not-to-be-stored (in this example, 2-byte data) in the FCDR. Alternatively, the FCDR may store the entire "8 bytes" including the "2 bytes", instead of only the "2 bytes" in the area-not-to-be-stored.

The cache memory controlling unit then generates new data-to-be-stored by merging the obtained existing data-not-to-be-stored with the data-to-be-stored detected earlier in the area-to-be-stored, and writes the data in the detected address in the cache memory (see Step (4) in FIG. 1). To explain more specifically with reference to the example, the cache memory controlling unit reads and stores the "2-byte" existing data-not-to-be-stored, obtained and maintained in the FCDR, into the WB; at the same time, the cache memory controlling unit generates new "8-byte" store data by merging this existing data-not-to-be-stored with the "6-byte" data-to-be-stored, and stores the generated new store data in the WB. The cache memory controlling unit then reads the new "8-byte" store data from the WB, and writes the data in the detected address in the DATA-RAM, the address A.

The cache memory controlling unit generates an ECC for the new store data written in the cache memory, based on the generated new store data (see step (5) in FIG. 1). To explain more specifically with reference to the example, the cache memory controlling unit generates a 1-byte ECC for the new store data written in the DATA-RAM from the "8-byte" new store data generated and maintained in the WB, and stores the ECC in the ECC-RAM.

In this manner, before executing the store, the cache memory controlling unit according to the first embodiment brings the data from the area-not-to-be-stored (the data in the area not overwritten by the store data) and maintains the data itself in the WB, instead of the ECC generated from the data stored previously in the DATA-RAM; and merges the data-to-be-stored with the data in the area-not-to-be-stored to generate new store data and an ECC. As a result, as mentioned above as the main characteristic, the main characteristic of the cache memory is in that SSI can be prevented from occurring even when equal to or less than 8-byte data is consecutively stored to the same address, and that a correct ECC can be generated.

Structure of Cache Memory Controller

Figure 2:
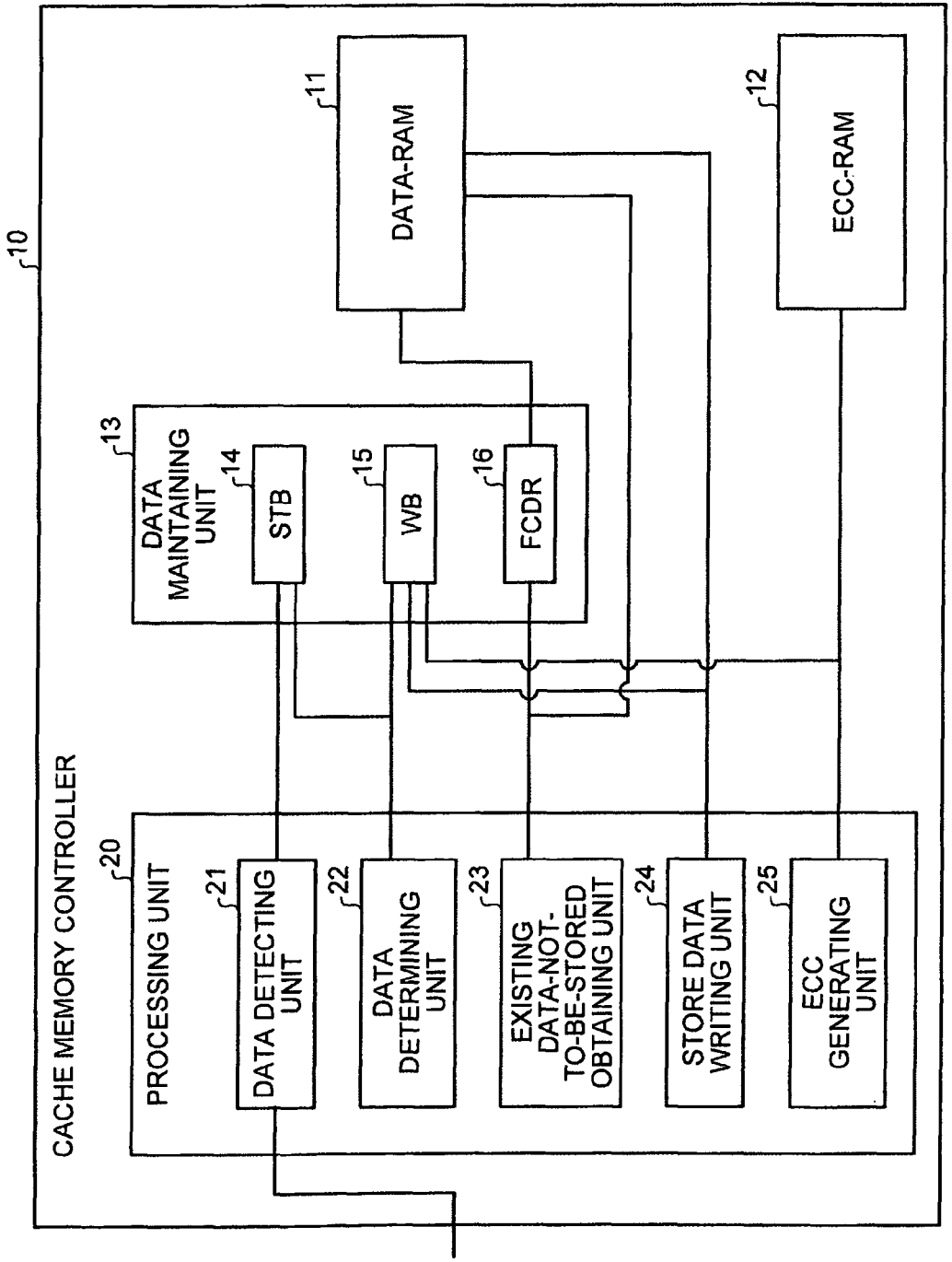
FIG. 2 is a block diagram of a structure of a cache memory controlling unit according to the first embodiment.

A structure of the cache memory controlling unit depicted in FIG. 1 will now be explained with reference to FIG. 2. FIG. 2 is a block diagram of the structure of the cache memory controlling unit according to the first embodiment. As depicted in FIG. 2, a cache memory controlling unit 10 includes a DATA-RAM 11, an ECC-RAM 12, a data maintaining unit 13, and a processing unit 20.

The DATA-RAM 11 is a cache memory storing therein a plurality of pieces of data in a unit of 8 bytes. More specifically, the DATA-RAM 11 is caused to store data output from the execution unit by way of the instruction processing unit, or to serve the data for reads by the instruction processing unit.

The ECC-RAM 11 is a memory for storing therein ECC data generated by an ECC generating unit 25 that is to be described later. More specifically, the ECC-RAM 12 stores therein 1-byte ECC data generated by the ECC generating unit 25 correspondingly to each piece of data stored in the DATA-RAM 11.

The data maintaining unit 13 is a buffer that temporarily stores therein the store data received from the execution unit to enable the processing unit 20 to be described later to perform various processes thereto. In a close relationship with the embodiment, the data maintaining unit 13 includes an STB 14, a WB 15, and an FCDR 16.

Figure 3:
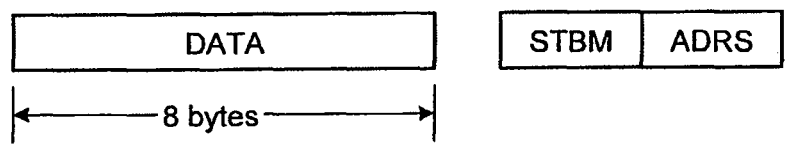
FIG. 3 is a schematic of an example of a structure of information stored in an STB.

The STB 14 is a buffer that temporarily stores therein the store data received from the execution unit. To explain with a specific example, when the execution unit transmits store data and the instruction processing unit outputs store-related information such as a store address, a store data width, and aligning information together with a store instruction, the STB 14 stores therein data-to-be-stored (store byte mark (STBM)) and a store address (ADRS), each detected (generated) and stored by a data detecting unit 21 to be described later, as depicted in FIG. 3. The STBM indicates which bytes of store data are to be stored, and the store address indicates where in the DATA-RAM the data is to be stored. FIG. 3 is a schematic of an example of a structure of the information stored in the STB.

Figure 4:
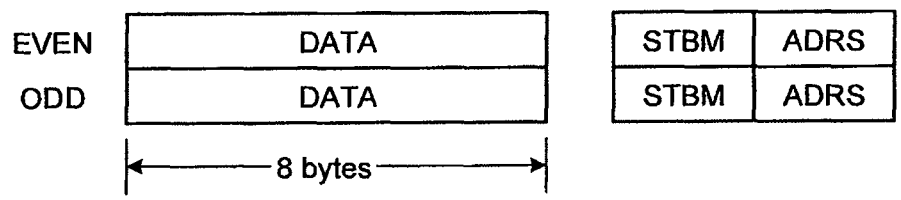
FIG. 4 is a schematic of an example of a structure of information stored in a WB.

When the data-area-to-be-stored, the area-not-to-be-stored, and the store address are detected before storing the store data taken out from the STB 14 in the DATA-RAM 11, the WB 15 maintains the store data output from the STB 14. For example, as depicted in FIG. 4, in the same manner as in the STB 14, the WB 15 maintains the data-to-be-stored (store byte mark (STBM)) and a store address (ADRS), associated with each of EVEN and ODD, as depicted in FIG. 4. FIG. 4 is a schematic of an example of a structure of the information stored in the WB.

Figure 5:
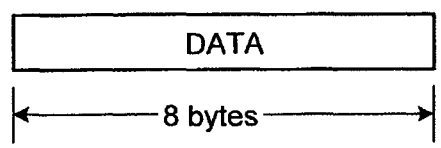
FIG. 5 is a schematic of an example of a structure of information stored in an FCDR.

The FCDR 16 is a buffer that temporarily stores therein the data written in and output from the area-not-to-be-stored in the DATA-RAM 11, as existing data-not-to-be-stored. More specifically, the FCDR 16 stores therein data read by an existing data-not-to-be-stored obtaining unit 23 from the address in the DATA-RAM 11 where existing data-not-to-be-stored, written in an area-not-to-be-stored that is not to be stored, from the store data detected by the data detecting unit 21, is stored. For example, the FCDR 16 maintains existing data-not-to-be-stored, read from the DATA-RAM 11, in an 8-byte area as depicted in FIG. 5. FIG. 5 is a schematic of an example of a structure of information stored in the FCDR.

The processing unit 20 is a processing unit that executes various processes. Especially in a close relationship with the embodiment, the processing unit 20 includes the data detecting unit 21, a data determining unit 22, the existing data-not-to-be-stored obtaining unit 23, a store data writing unit 24, and the ECC generating unit 25.

Upon receiving store data from the execution unit, the data detecting unit 21 detects therein the address in the cache memory into which the store data is stored; the area-to-be-stored where the store data is to be stored; and the area-not-to-be-stored that is not to be stored, from the store data. More specifically, upon receiving an 8-byte store data from the execution unit, the data detecting unit 21 stores the data-to-be-stored (store byte mark (STBM)) and a store address (ADRS) detected from the store data in the STB 14. The data detecting unit 21 also detects an area-not-to-be-stored that is not to be stored from the store data, and transmits the store data to the WB 15. For example, the data detecting unit 21 causes the STB 14 to maintain STBM that is the area to be stored (6 bytes), and the store address (ADRS=address A) detected in the store data received from the execution unit. At the same time, the data detecting unit 21 detects the area-not-to-be-stored that is not to be stored (2 bytes), and transmits the store data to the WB 15.

The data determining unit 22 determines if any other data written in the address in the cache memory detected by the data detecting unit 21 is present. To explain with a specific example, the data determining unit 22 refers to the address "ADRS" in the DATA-RAM 11, the address detected and stored in the STB 14 by the data detecting unit 21, and determines if other data is already written therein. The result of the determination is notified to the existing data-not-to-be-stored obtaining unit 23 to be described later.

If the data determining unit 22 determines that other data written in the address of the cache memory is present, the existing data-not-to-be-stored obtaining unit 23 obtains the data written in the area-not-to-be-stored, detected by the data detecting unit 21, out of the data written in the address, as existing data-not-to-be-stored. To explain more specifically with reference to the example, when the existing data-not-to-be-stored obtaining unit 23 is notified from the data determining unit 22 that other data is present in the address "ADRS (e.g., address A)" in the DATA-RAM 11, that is, if a cache hit occurs, the existing data-not-to-be-stored obtaining unit 23 obtains the data written in the detected area-not-to-be-stored (2 bytes), out of the data written in the address, and stores the data in the FCDR 16 as existing data-not-to-be-stored (in this example, the 2-byte data).

The store data writing unit 24 merges the existing data-not-to-be-stored obtained by the existing data-not-to-be-stored obtaining unit 23 with the data-to-be-stored in the area-to-be-stored detected by the data detecting unit 21 to generate new store data. The store data writing unit 24 then writes the new store data into the address in the cache memory detected by the data detecting unit 21. To explain more specifically with reference to the example, the store data writing unit 24 merges the "2-byte" existing data-not-to-be-stored stored in the FCDR 16 with the "6-byte" data-to-be-stored in the area-to-be-stored and stored in the WB 15, in the WB 15 (e.g., processes these pieces of data with an EOR circuit) to generate new "8-byte" store data. The store data writing unit 24 then stores the new store data in the WB 15. The store data writing unit 24 then reads the new "8-byte" store data from the WB 15, and writes the data into the detected address "ADRD (e.g., address A)" in the DATA-RAM 11.

The ECC generating unit 25 generates an ECC for the new store data written in the cache memory by the store data writing unit 24, from the new store data generated by the store data writing unit 24. To explain more specifically with reference to the example, the ECC generating unit 25 reads the new "8-byte" store data generated by the store data writing unit 24 and stored in the WB 15, generates a 1-byte ECC for the new store data written in the DATA-RAM, and stores the ECC to the ECC-RAM 12.

Process Performed by Cache Memory Controlling Unit

Figure 6:
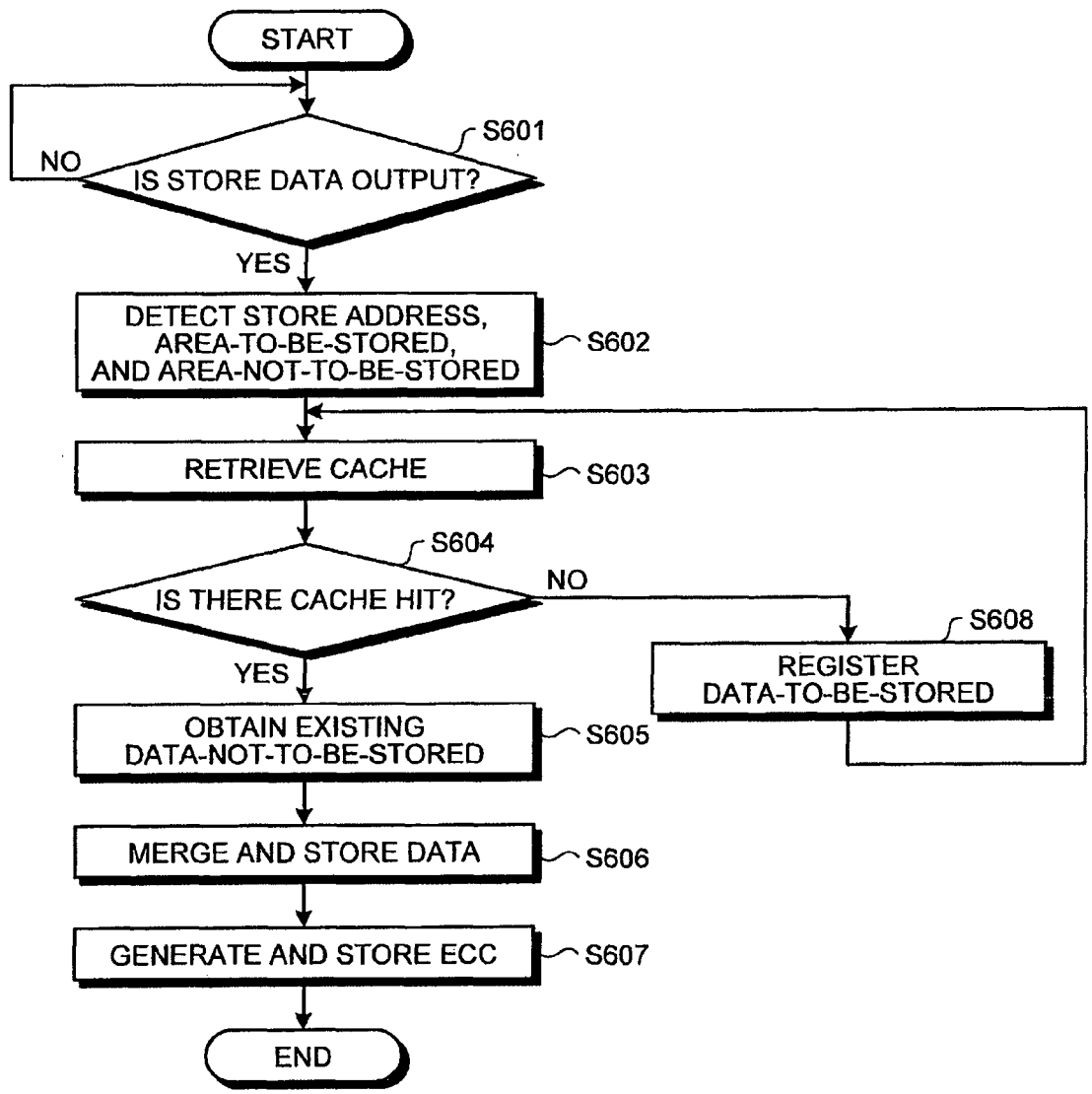
FIG. 6 is a flowchart of a process performed by the cache memory controlling unit according to the first embodiment.

A process performed by the cache memory controlling unit will now be explained with reference to FIG. 6. FIG. 6 is a flowchart of the process performed by the cache memory controlling unit according to the first embodiment.

As depicted in FIG. 6, if store data is received from the execution unit (YES at Step S601), the data detecting unit 21 included in the cache memory controlling unit 10 stores the data-to-be-stored (store byte mark (STBM)) and the store address (ADRS) into the STB 14, detects the area-not-to-be-stored that is not to be stored, from the store data, and transmits the store data to the WB 15 (Step S602).

The data determining unit 22 then refers to the address "ADRS" in the DATA-RAM 11, such an address detected by the data detecting unit 21 and maintained in the STB 14, and determines if any other data is already written therein. In other words, the data determining unit 22 retrieves the cache (Step S603).

If any other data is already written therein (a cache hit occurs) (YES at Step S604), the existing data-not-to-be-stored obtaining unit 23 obtains the data written in the area-not-to-be-stored, out of the data written in the address, from the DATA-RAM 11 as existing data-not-to-be-stored, and stores the obtained existing data-not-to-be-stored in the FCDR 16 (Step S605).

The store data writing unit 24 then reads the existing data-not-to-be-stored stored in the FCDR 16 into the WB 15, merges the data with the data-to-be-stored, which is in the area to be stored maintained in the WB 15, in the WB 15 to generate new store data, and writes the new store data to the detected address in the DATA-RAM 11 (Step S606).

The ECC generating unit 25 generates an ECC for the new store data that is written in the DATA-RAM 11 by the store data writing unit 24, from the new store data generated by the store data writing unit 24. The ECC generating unit 25 then stores the ECC in the ECC-RAM 12 (Step S607).

On the contrary, referring back to Step S604, if no data-to-be-stored is written (a cache miss occurs) (NO at Step S604), the data that is the store data to be written is registered (Step S608), and the cache is retrieved again (Step S603).

Effects of First Embodiment

As described above, according to the first embodiment, upon receiving store data from an execution unit, the cache memory controller detects a write address in the cache memory where the store data is to be stored, a store area that is to be stored, and an area-not-to-be-stored that is not to be stored, from the store data; determines if any data-to-be-stored stored previously in the detected write address is present; obtains the data written in the detected area-not-to-be-stored, out of the data written in the write address, as existing data-not-to-be-stored, if it is determined that the data-to be-stored is stored in the write address; merges the obtained existing data-not-to-be-stored with the data-to-be-stored in the detected area-to-be-stored to generate new store data, and writes the new store data to the detected write address; and generates an ECC for the new store data written in the cache memory, based on the generated new store data. Therefore, it is possible to prevent SSI from occurring even when equal to or less than 8-byte data is stored consecutively to the same address, and to generate a correct ECC.

More specifically, the cache memory controller generates new store data, as well as an ECC, using the data itself stored in the DATA-RAM, instead of an ECC generated based on the data stored previously. Therefore, the cache memory controller can perform the process without waiting for an ECC to be generated for preceding data. As a result, it is possible to prevent SSI from occurring even when equal to or less than 8-byte data is stored consecutively to the same address, and to generate a correct ECC. Moreover, a 1-bit error can be completely remedied in the RAM.

[b] Second Embodiment

The cache memory controller according to the first embodiment described above brings the data stored in the area-not-to-be-stored in the DATA-RAM to the FCDR or the WB before executing the store, and merges the store data with the data contained in the area-not-to-be-stored to generate new store data and an ECC; however, the present embodiment is not limited thereto. When the preceding data is stored in the same address, the cache memory controller can also generate new store data and an ECC taking the area-to-be-stored of the preceding store data into consideration in advance.

Therefore, in a second embodiment of the present invention, explanations will be given in detail how data is moved among the STB, the WB, and the FCDR that are the buffers on which store data is processed, and the DATA-RAM and the ECC-RAM in which store data and ECCs are stored, with reference to FIGS. 7 to 14. Furthermore, according to the second embodiment, in a situation where the preceding data is stored in the same address, the cache memory controller generates new store data and an ECC taking the area-to-be-stored of the preceding store data into consideration in advance.

Movement of Data in Each Process

Store Request Issued from Execution Unit/Instruction Processing Unit

Figure 7:
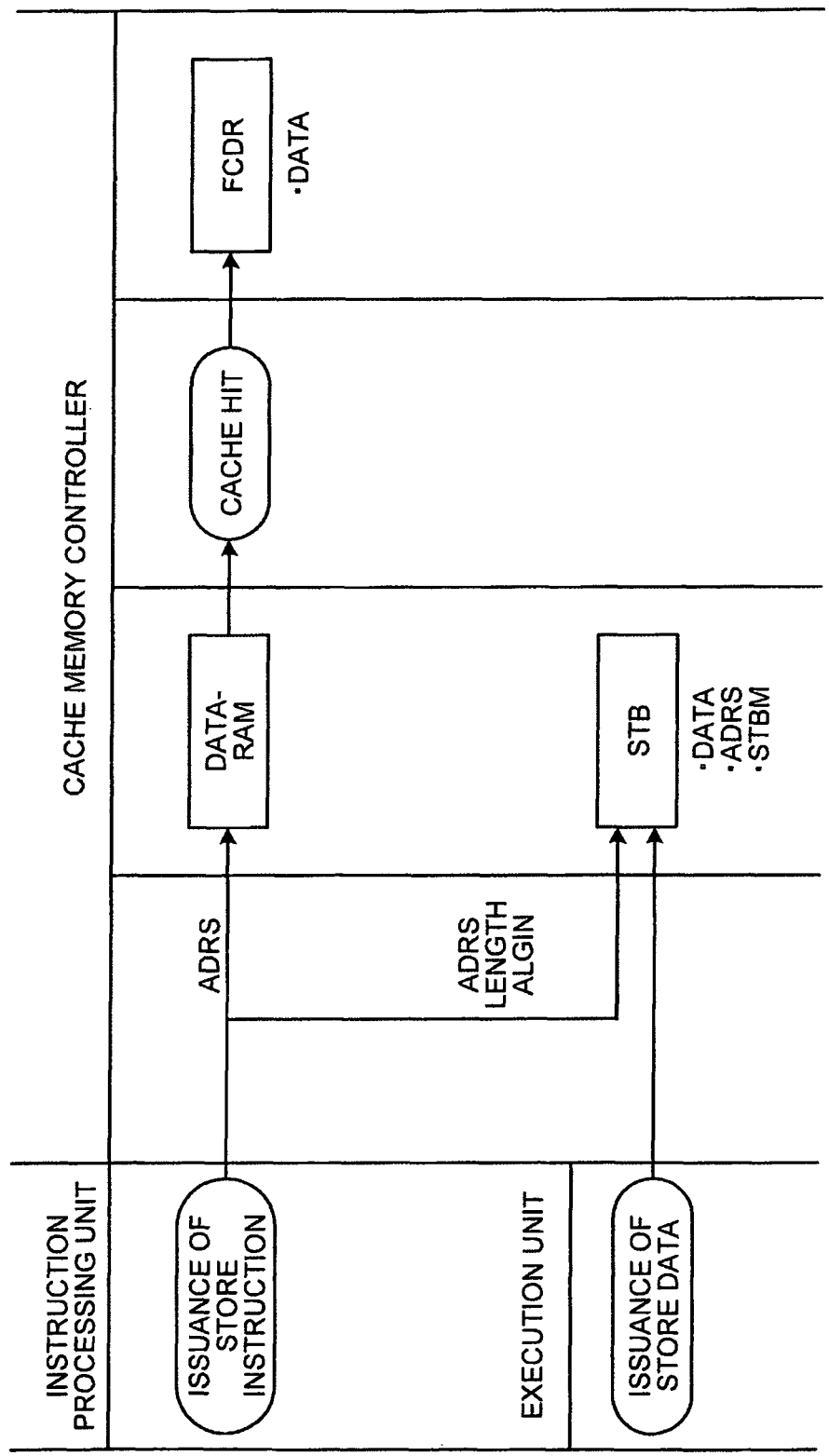
FIG. 7 is a schematic of movement of data in an IU-REQ process.

To begin with, an Instruction Unit-Request (IU-REQ) process that is executed upon receiving a store request from the execution unit/the instruction processing unit will be explained with reference to FIG. 7. FIG. 7 is a schematic of movement of data in the IU-REQ process.

As depicted in FIG. 7, the instruction processing unit transmits (issues) a store instruction that is accompanied by store-related store information such as a store address, a store data width, and aligning information to the cache memory controlling unit. Upon receiving the issued store instruction, the cache memory controlling unit generates STBM from the information, and stores the information into the STB together with the ADRS.

The cache memory controlling unit then inputs the store instruction to a pipeline, and checks if the cache line to be stored is in the cache memory (DATA-RAM). The cache memory controlling unit reads the data from the 8-byte data cache memory using the store address, and checks the data for an error. If a cache hit occurs, the cache memory controlling unit sets the read data in the area-to-be-stored to the FCDR. If a cache miss occurs, the cache memory controlling unit requests the data from the main memory.

Writing from STB into WB

Figure 8:
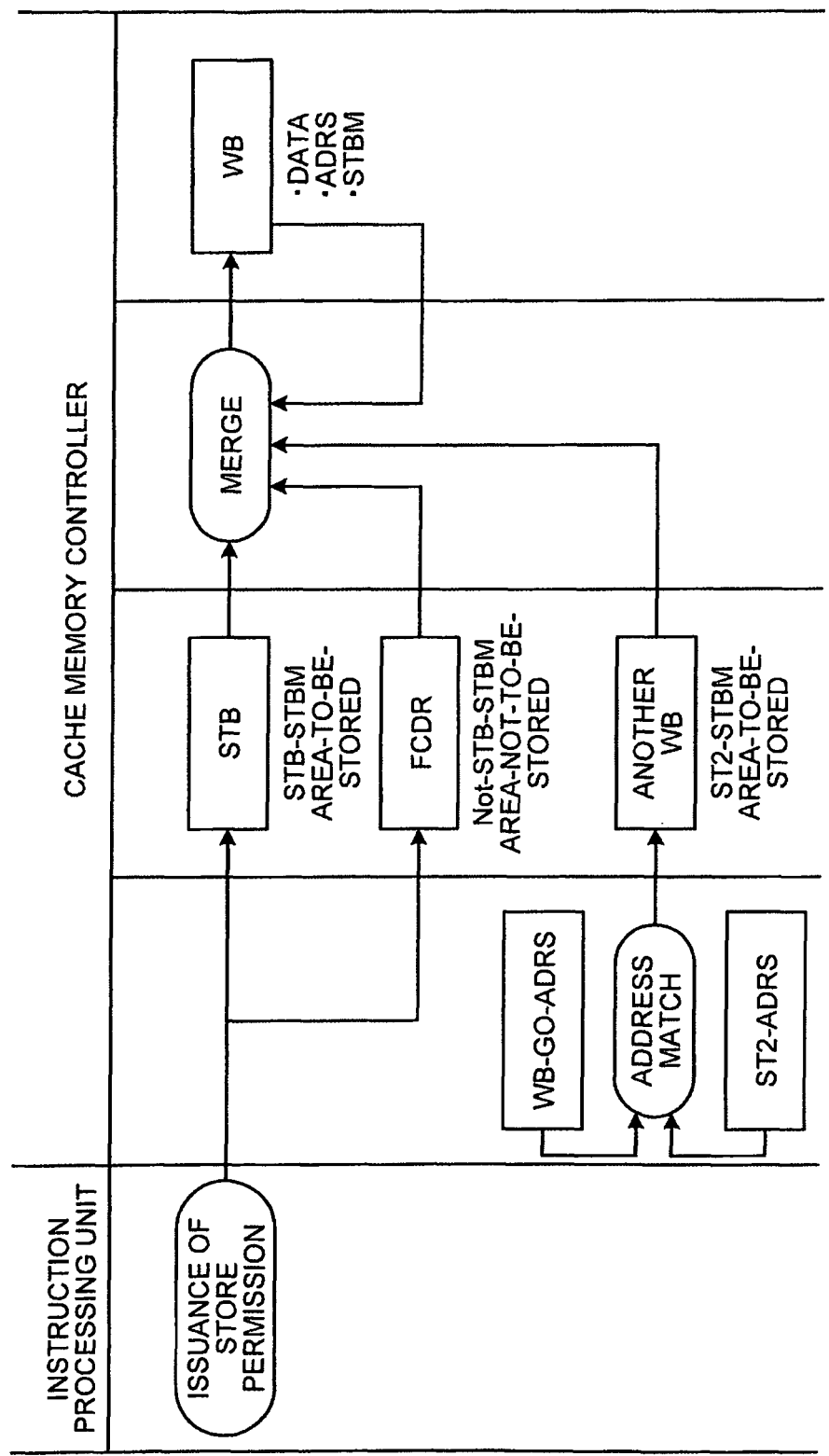
FIG. 8 is a schematic of movement of data in a WB-GO process.

A Write-Buffer-GO (WB-GO) process in which store data is written from the STB into the WB will now be explained with reference to FIG. 8. FIG. 8 is a schematic of movement of data in the WB-GO process.

As depicted in FIG. 8, when the cache memory controlling unit receives a store permission from the instruction processing unit, and if the STB that is to be processed has the highest priority and there is an space in the WB, the cache memory controlling unit issues a WB-GO (write request). In response, the cache memory controlling unit reads the data in the area-to-be-stored from the STB, and data in the area-not-to-be-stored from the FCDR, respectively, and updates the WB with the data. The cache memory controlling unit determines the area-to-be-stored based on the STB-STBM.

In addition, the cache memory controlling unit performs an address match between a WB-GO-ADRS of the current store data-to-be-stored (STB-ADRS that is to be processed by WB-GO) and the ST2-ADRS (address in the ST2-REQ) of the preceding store data that is the store data transmitted from the execution unit prior to the current store data. If the ST2-REQ is at the same timing as the WB-GO, the cache memory controlling unit refers to the ST2-STBM, merges the ST2-DATA additionally, and writes the data into the WB. In other words, if a match occurs between the DATA-RAM address in which the preceding store data is to be stored and the DATA-RAM address into which the current store data is to be stored, the cache memory controlling unit obtains the data-to-be-stored of the preceding data from the WB, and merges the current data-to-be-stored and the existing data-not-to-be-stored obtained from the FCDR with the data-to-be-stored of the preceding store data, and writes the data into the WB.

Retrieving Cache Memory

Figure 9:
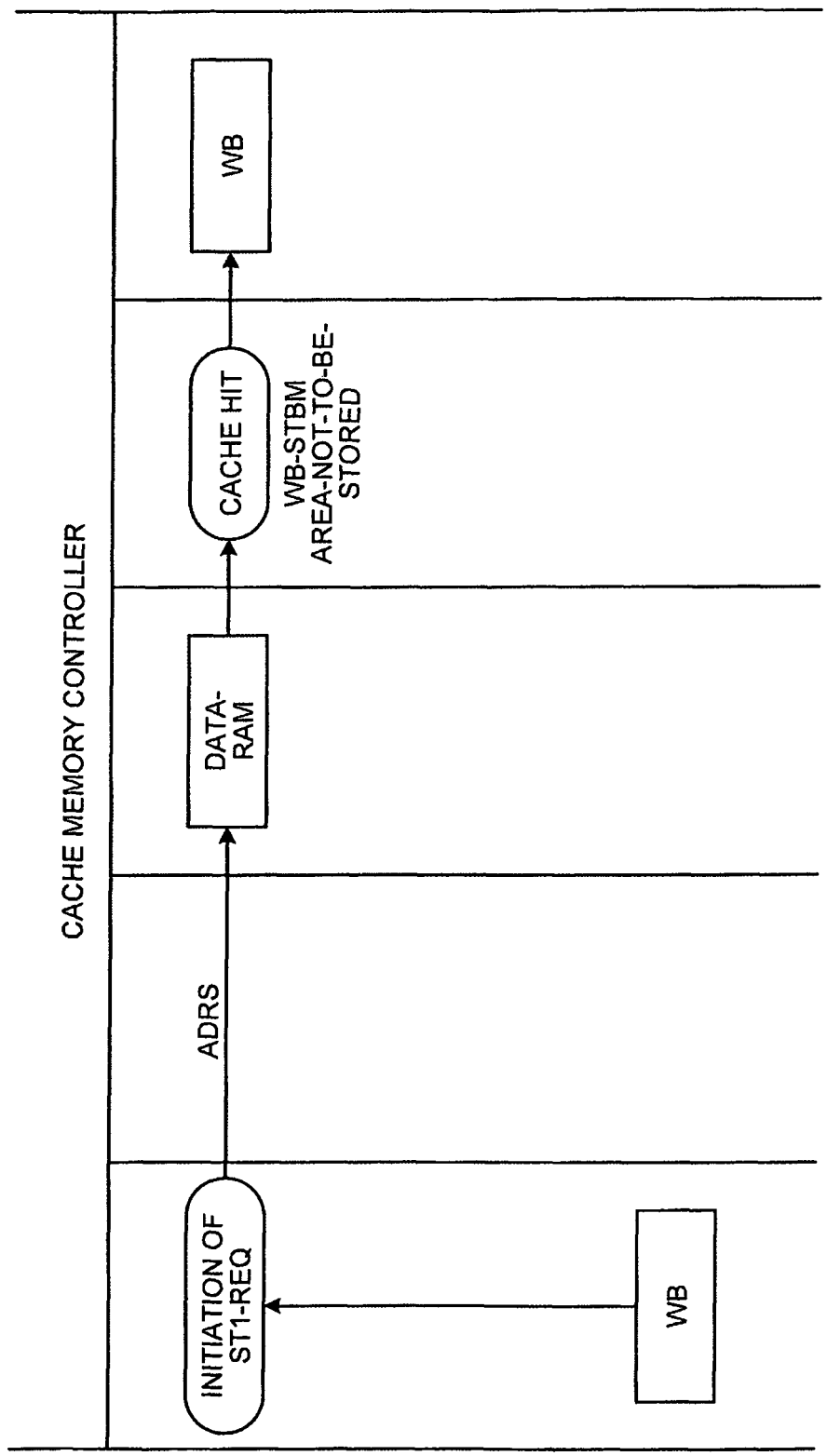
FIG. 9 is a schematic of movement of data in an ST1-REQ process.

A Store1-Request (ST1-REQ) process performed when a cache miss occurs in FIG. 7 will now be explained with reference to FIG. 9. FIG. 9 is a schematic of movement of data in the ST1-REQ process.

As depicted in FIG. 9, when the area-to-be-stored is not in the DATA-RAM although the store data has been stored in the WB, the cache memory controlling unit initiates the ST1-REQ from the WB. In response, the cache memory controlling unit retrieves the cache memory using the WB-ADRS. If a cache hit occurs and no error is present in the DATA-RAM, the cache memory controlling unit writes only the data in the area-not-to-be-stored into the WB using the WB-STBM. If a cache miss occurs, the cache memory controlling unit requests the data from the main memory.

Writing into Cache Memory

Figure 10:
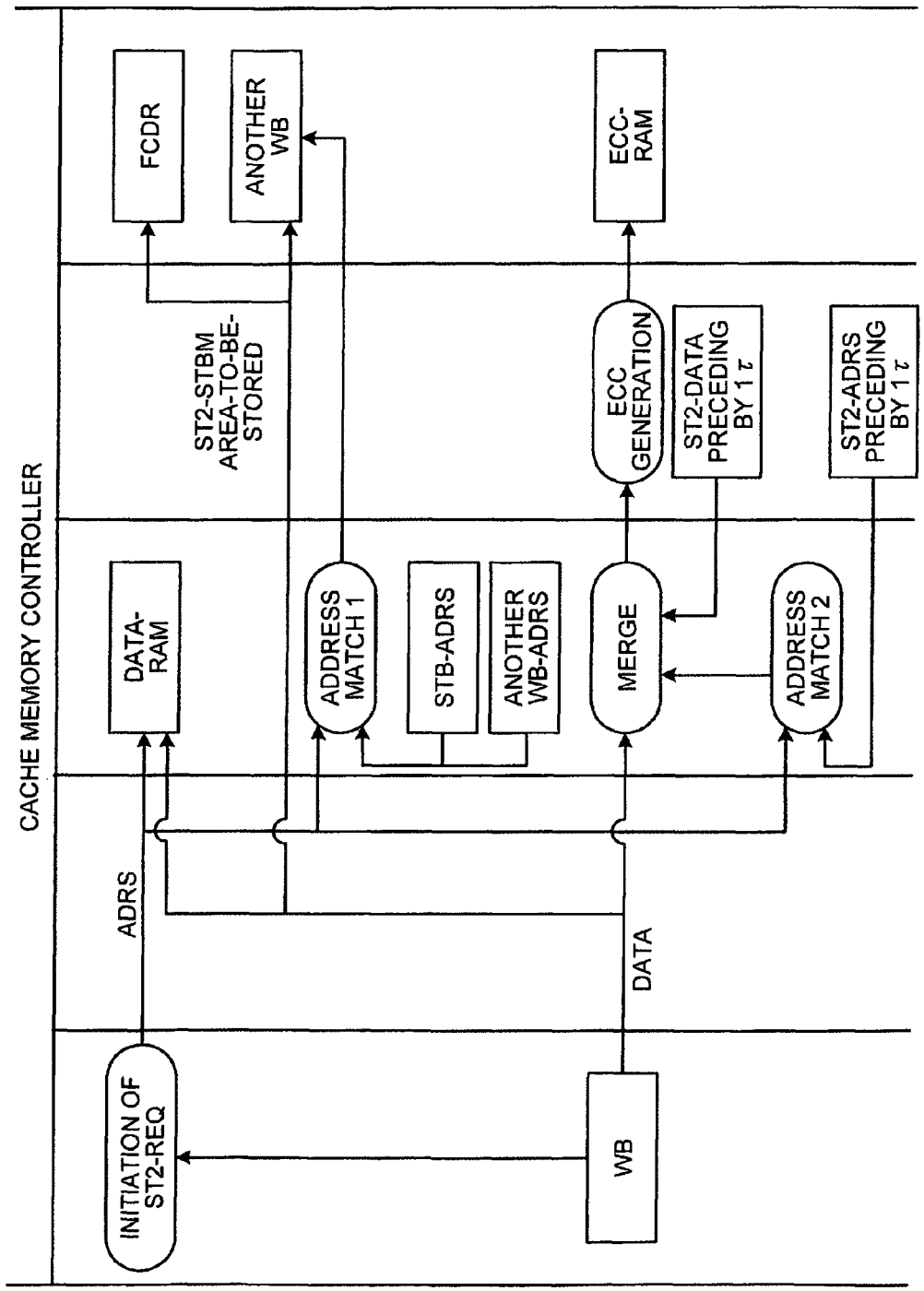
FIG. 10 is a schematic of movement of data in an ST2-REQ process.

A Store2-Request (ST2-REQ) performed upon writing store data from the WB to the cache memory and upon generating an ECC will now be explained with reference to FIG. 10. FIG. 10 is a schematic of movement of data in the ST2-REQ process.

As depicted in FIG. 10, if the area-to-be-stored is present in the cache memory, the cache memory controlling unit initiates the ST2-REQ from the WB. Upon initiating the ST2-REQ, the cache memory controlling unit takes out the store data from the WB requested by the ST2-REQ, and updates the DATA-RAM with the data. The cache memory controlling unit then generates a 1-byte ECC corresponding to 8-byte data based on this data, and writes the ECC to the ECC-RAM.

If the addresses of the ST2-ADRS and the STB-ADRS (an address in each store buffer) match, then the cache memory controlling unit reflects the data onto the target FCDR. At this time, the cache memory controlling unit updates only the area-to-be-stored using the ST2-STBM. Furthermore, if the addresses of the ST2-ADRS and another WB-ADRS (a WB address excluding the one onto which the ST2 is executed) match, the cache memory controlling unit reflects the store data onto the target WB. In this situation as well, the cache memory controlling unit updates only the area-to-be-stored using the ST2-STBM.

Moreover, when ST2-REQ is generated consecutively, the cache memory controlling unit cannot reflect the prior store data onto the WB to which the next storing is executed. Therefore, if the ST2-ADRS that is an address of a store preceding by $1\tau$ makes a match with the ST2-ADR before generation of an ECC, the store data is merged with the data preceding by $1\tau$.

Performing Each Process

A process flow of each of the processes "store request issued from the execution unit/instruction processing unit (IU-REQ)", "writing from the STB to the WB (WB-GO)", "retrieving cache memory (ST1-REQ)", and "writing into cache memory (ST2-REQ)" will now be explained with reference to FIGS. 11 to 14. "LID" mentioned in a flowchart of each of these processes suggests that an area-to-be-stored is exclusively servicing in the cache memory, and the "LID" is updated when a cache hit occurs, and stored in the STB and the WB.

IU-REQ Process

Figure 11:
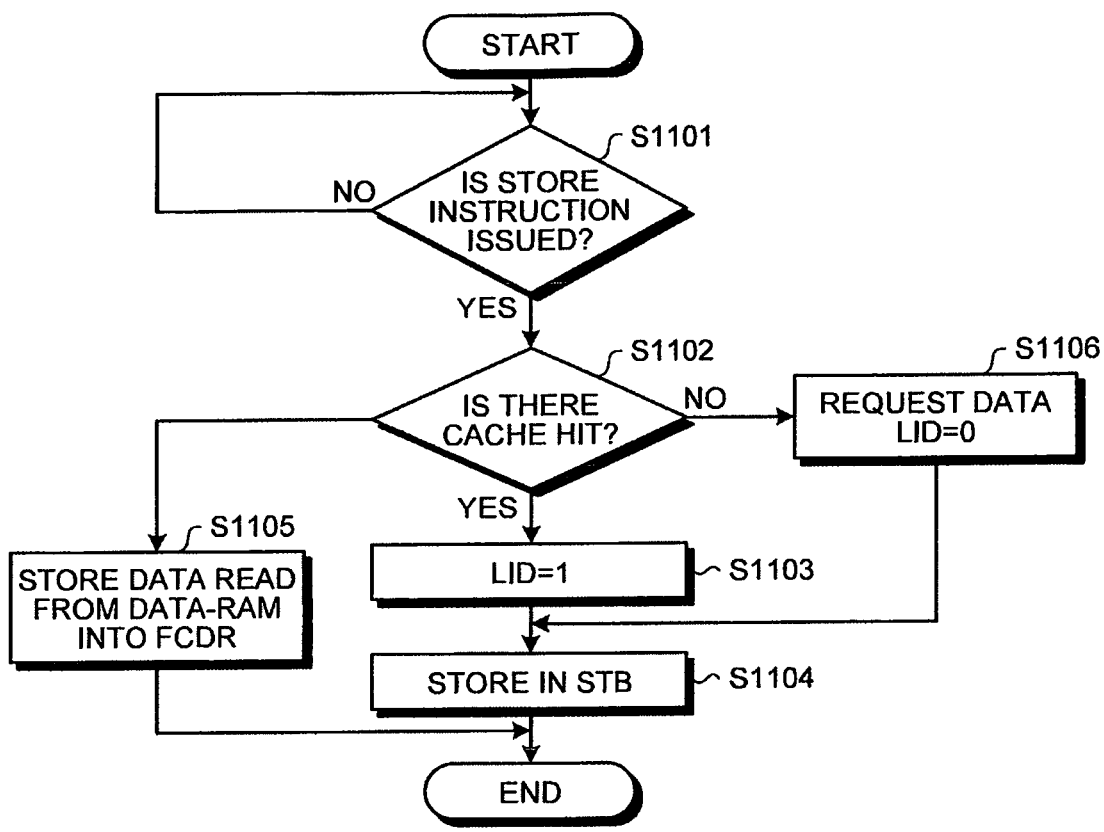
FIG. 11 is a flowchart of the IU-REQ process.

To begin with, the IU-REQ, depicted in FIG. 7, will be explained with reference to FIG. 11. FIG. 11 is a flowchart of the IU-REQ process.

As depicted in FIG. 11, if the instruction processing unit transmits (issues) a store instruction (YES at Step S1101), the cache memory controlling unit determines if the data-to-be-stored is stored in the DATA-RAM (retrieves the cache) (Step S1102).

If no cache hit occurs (YES at Step S1102), the cache memory controlling unit updates the "LID" to "1" (Step S1103), generates STBM from the received store data, and stores the STBM into the STB together with the ADRS (Step S1104). At the same time, the cache memory controlling unit reads the data-to-be-stored making a cache hit from the DATA-RAM, and stores the data into the FCDR (Step S1105).

On the contrary, if no cache hit occurs (NO at Step S1102), the cache memory controlling unit updates the "LID" to "0", generates STBM from the received store data, and stores the STBM into the STB together with the ADRS (Step S1106).

WB-GO Process

Figure 12:
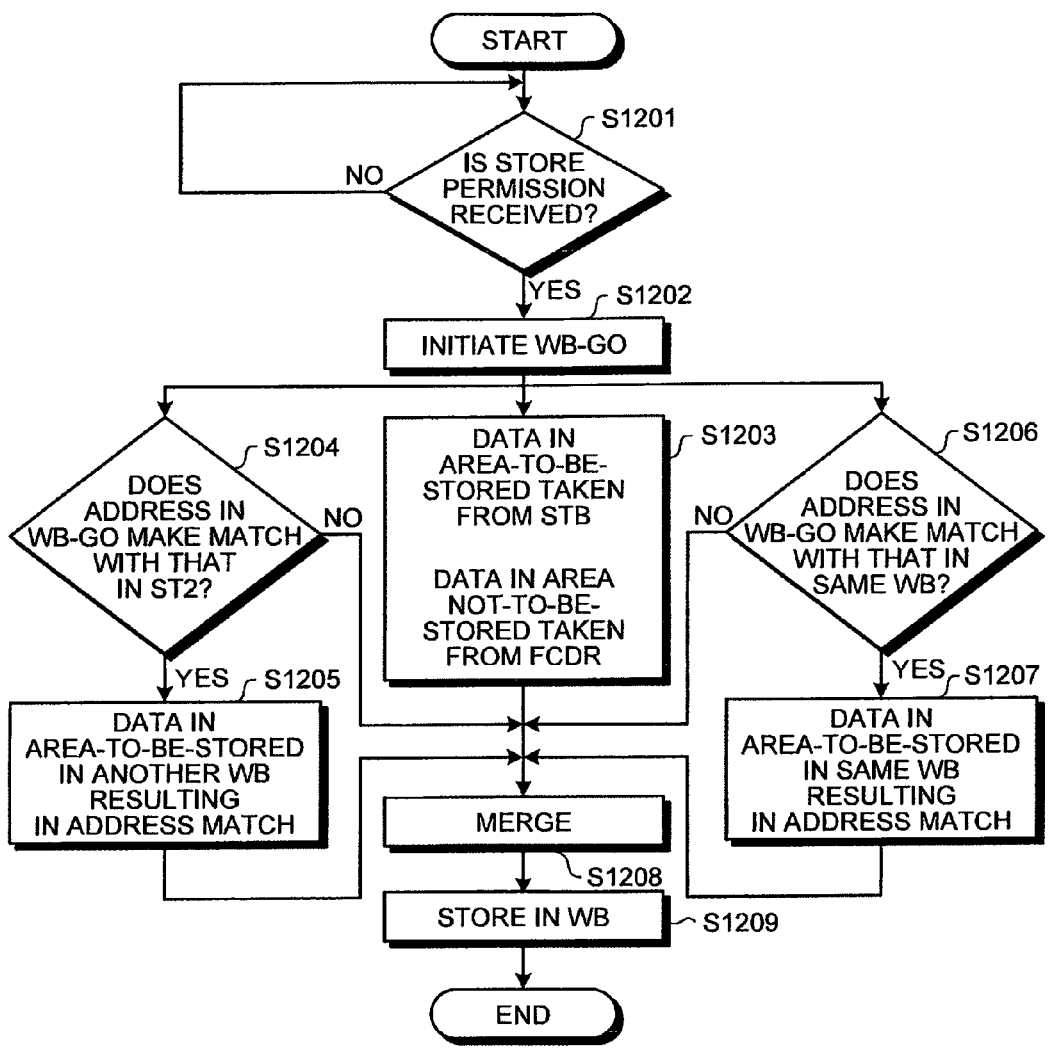
FIG. 12 is a flowchart of the WB-GO process.

The WB-GO process depicted in FIG. 8 will now be explained with reference to FIG. 12. FIG. 12 is a flowchart of the WB-GO process.

As depicted in FIG. 12, upon receiving a store permission from the instruction processing unit (YES at Step S1201), the cache memory controlling unit issues a WB-GO request, and executes the WB-GO process (Step S1202).

In response, the cache memory controlling unit merges the following data, that is: the data-to-be-stored, in the area-to-be-stored, obtained from the STB; the existing data-not-to-be-stored that is the data in the area-not-to-be-stored and obtained from the FCDR; the data-to-be-stored obtained from another WB when the address in the WB-GO and the address in the ST2 (the data-to-be-stored in the preceding store data) match; and the data-to-be-stored obtained from the same WB when the address in the WB-GO and the address in the same WB (the data-to-be-stored in the preceding store data) match (Step S1203 to Step S1208). The cache memory controlling unit then stores the merged data in the WB (Step S1209).

ST1-REQ Process Flow

Figure 13:
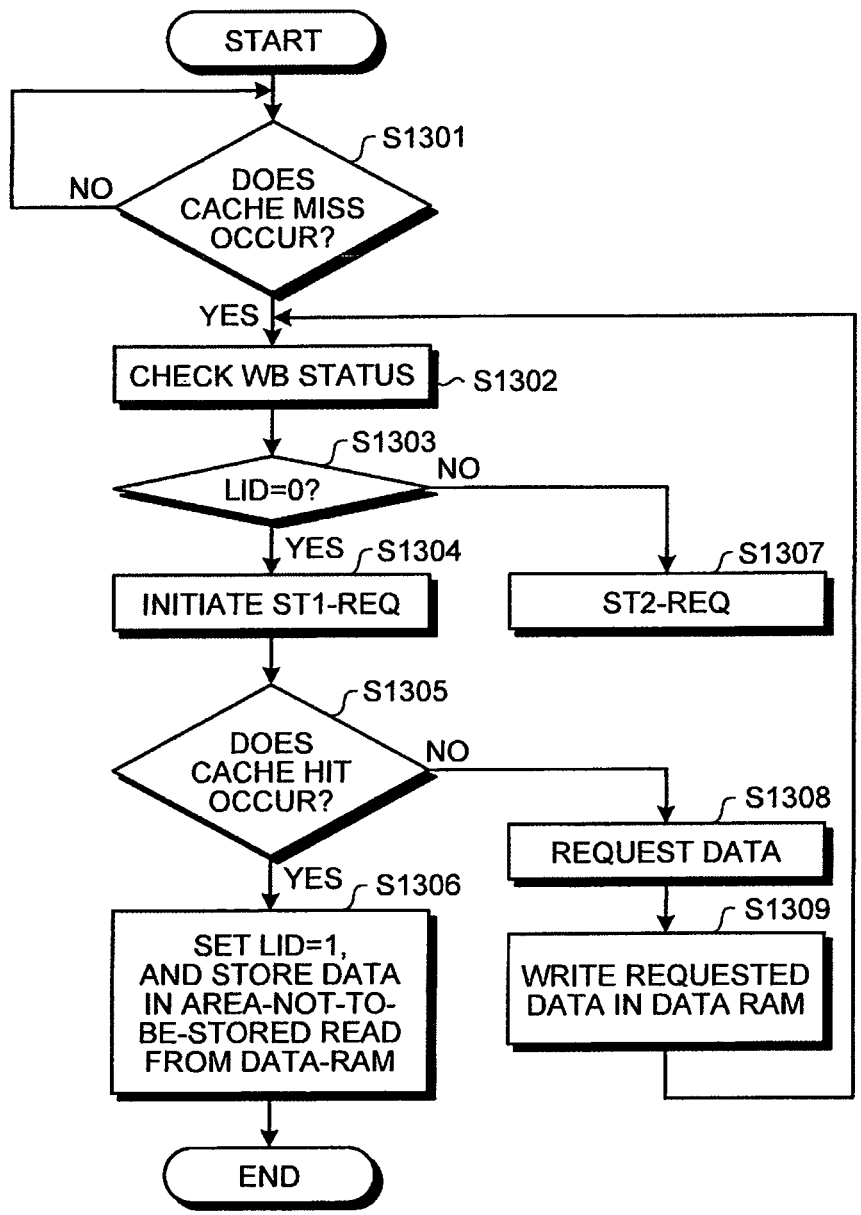
FIG. 13 is a flowchart of the ST1-REQ process.

The ST1-REQ process depicted in FIG. 9 will now be explained with reference to FIG. 13. FIG. 13 is a flowchart of the ST1-REQ process.

As depicted in FIG. 13, if a cache miss occurs (YES at Step S1301), the cache memory controlling unit checks the status of the WB (Step S1302).

If the LID in the WB is set to "0" (YES at Step S1303), the cache memory controlling unit initiates an ST1-REQ (Step S1304).

The cache memory controlling unit retrieves the cache again for the store data received from the execution unit (Step S1305). If a cache hit occurs (YES at Step S1305), the cache memory controlling unit updates the LID to "1", reads the data-to-be-stored that made the cache hit from the DATA-RAM, and stores the data in the WB (Step S1306).

On the contrary, if a cache hit does not occur (NO at Step S1305), the cache memory controlling unit requests the received store data to the main memory (Step S1308), writes the data into the DATA-RAM (Step S1309), and performs Step S1302 and the steps thereafter.

Referring back to Step S1303, if the LID in the WB is not "0" (NO at Step S1303), the cache memory controlling unit initiates an ST2-REQ (Step S1307).

ST2-REQ Process Flow

Figure 14:
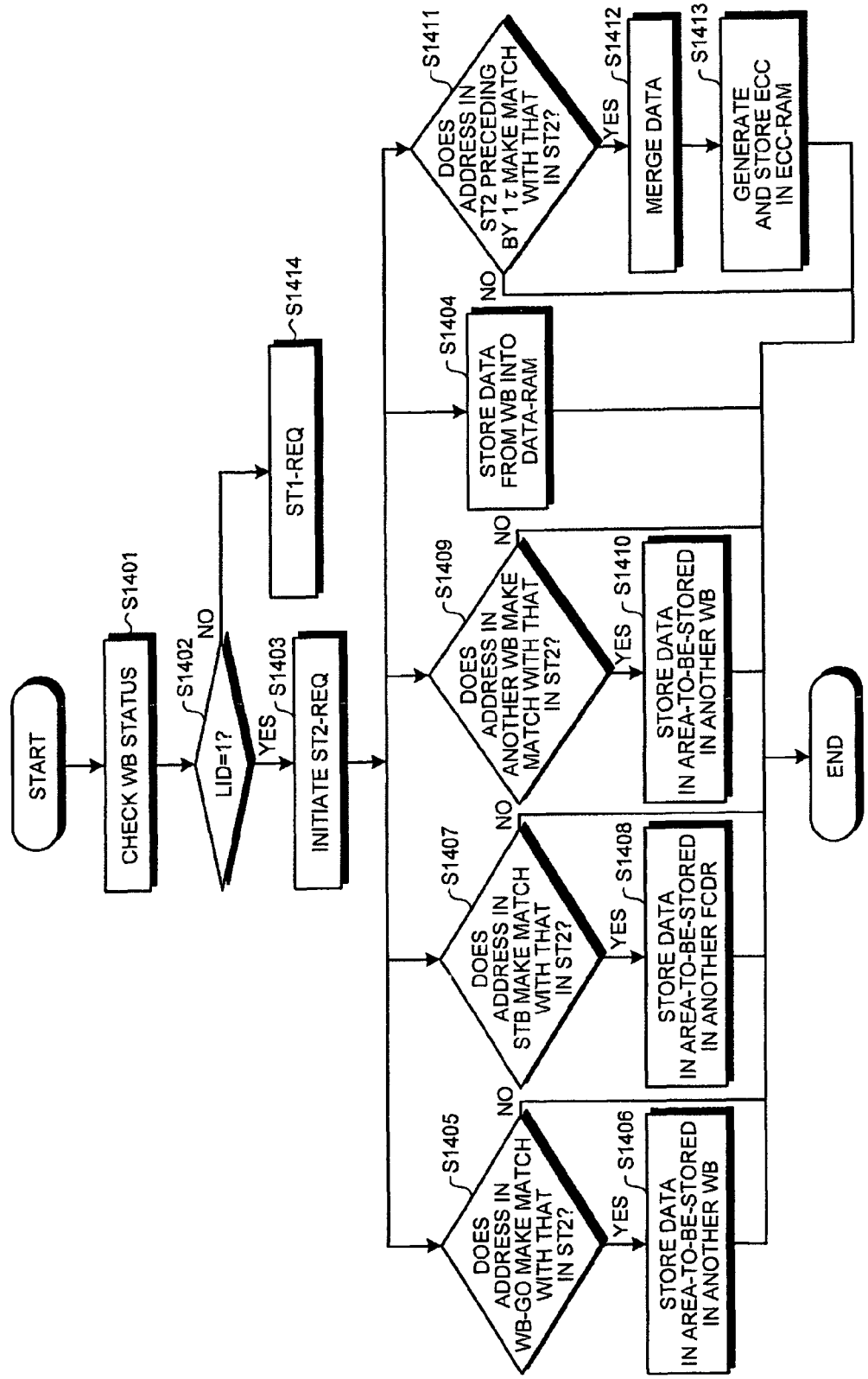
FIG. 14 is a flowchart of the ST2-REQ process.

The ST2-REQ process depicted in FIG. 10 will now be explained with reference to FIG. 14. FIG. 14 is a flowchart of the ST2-REQ process.

As depicted in FIG. 14, the cache memory controlling unit checks the status of the WB (Step S1401), and if the LID is "1" (YES at Step S1402), the ST2-REQ is initiated (Step S1403).

In response, the cache memory controlling unit stores the store data from the WB into the DATA-RAM (Step S1404). At the same time, if the address in the WB-GO makes a match with the address in the ST2 (YES at Step S1405), the cache memory controlling unit stores the data in the area-to-be-stored into another WB (Step S1406). In addition, if the address in the STB makes a match with the address in the ST2 (YES at Step S1407), the cache memory controlling unit stores the data in the area-to-be-stored into the FCDR (Step S1408). If the address in another WB makes a match with the address in the ST2 (YES at Step S1409), the cache memory controlling unit stores the data in the area-to-be-stored in that WB (Step S1410). If the address in the ST2 preceding by 1τ makes a match with the address in the ST2 (YES at Step S1411), the cache memory controlling unit merges the data preceding by 1τ into the current store data (Step S1412), generates an ECC based on the merged data, and stores the ECC in the ECC-RAM (Step S1413).

Referring back to Step S1402, if the LID is not "1" (NO Step S1402), a calculator initiates the ST1-REQ (Step S1414).

Effects of Second Embodiment

As described above, according to the second embodiment, if it is determined that the data-to-be-stored is not present in the write address in the cache memory, the cache memory controlling unit registers the data-to-be-stored, and then detects any data-already-stored stored in the detected address of the cache memory; if the cache memory controlling unit detects the data-already-stored stored in the detected address of the cache memory, the cache memory controlling unit merges new store data with the data-already-stored to further generate new store data, and writes the new store data in the write address detected by the data detecting unit; and the cache memory controlling unit generates an ECC for the new store data that is written in the cache memory based on the generated new store data. Therefore, even when a cache miss occurs, a correct ECC can be generated.

Furthermore, according to the second embodiment, when the execution unit transmits store data, the cache memory controlling unit detects a write address in the cache memory into which preceding data, transmitted from the execution unit prior to the store data, is stored, and a preceding area-to-be-stored that is to be stored from the preceding store data; the cache memory controlling unit further determines if the write address of the detected store data makes a match with the write address of the preceding store data; if it is determined that the write address of the store data makes a match with the write address of the preceding store data, the cache memory controlling unit merges the existing data-not-to-be-stored and the data-to-be-stored with the preceding data-to-be-stored in the detected preceding area-to-be-stored to generate new store data, writes the new store data into the write address in the cache memory, and generates an ECC for the new store data written into the cache memory based on the generated new store data. Therefore, the cache memory controlling unit can generate new store data and an ECC taking preceding store data into consideration. As a result, SSI can be prevented from occurring more reliably even when equal to or less than 8-byte data is stored consecutively to the same address, and a correct ECC can be generated more surely.

[c] Third Embodiment

The second embodiment explained the scenario where current store data is merged with, for example, preceding store data, or store data stored in the WB into which the current store data is to be stored to generate new store data. In this embodiment, it will be explained which data is to be prioritized in a merger operation.

Figure 15:
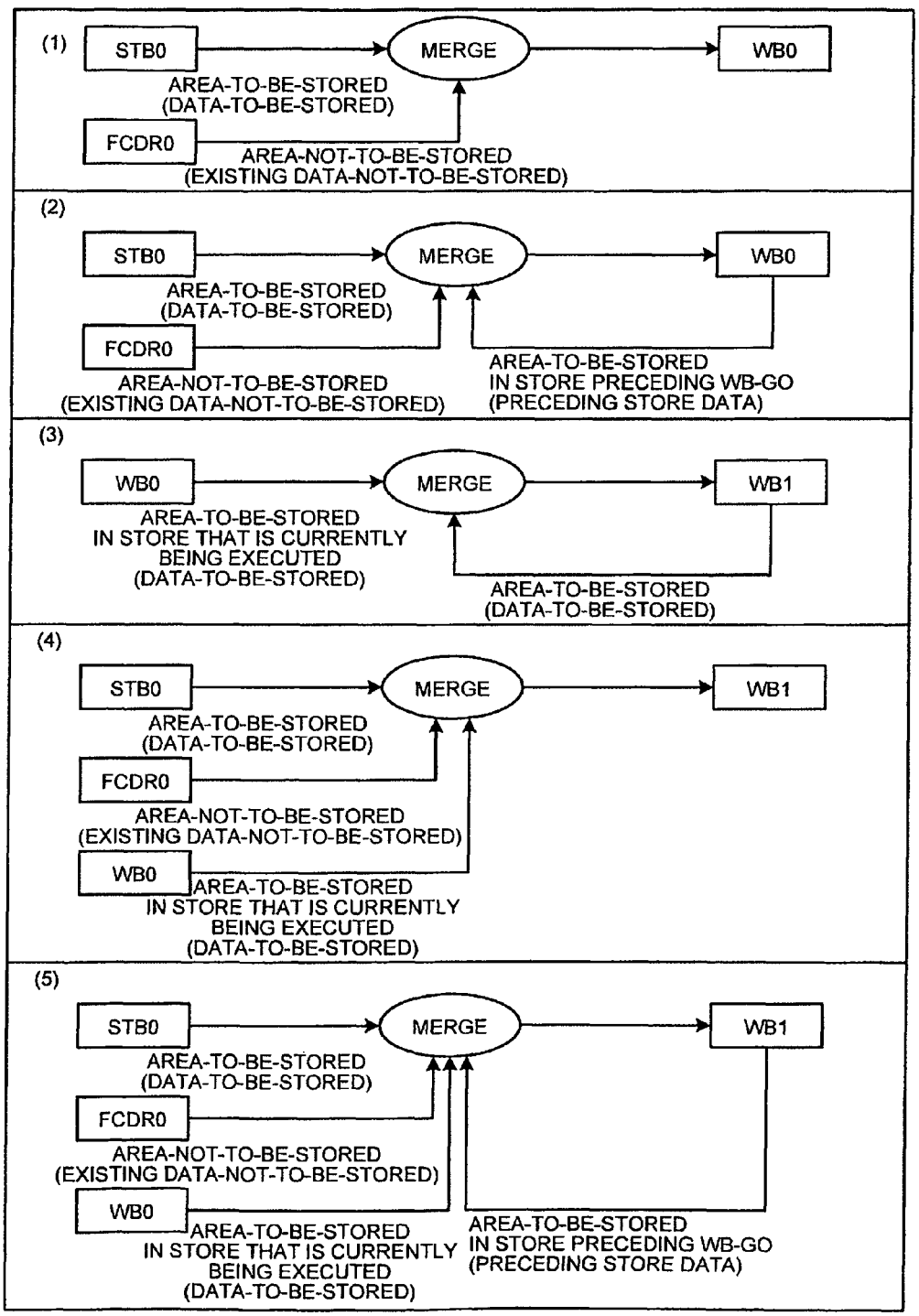
FIG. 15 is a schematic of examples of store data merger.

To begin with, it will be explained under what circumstances store data are merged with reference to FIG. 15. FIG. 15 is a schematic of an example of a merger of store data. "WB0" and "WB1" depicted in FIG. 15 indicate that these are physically different write buffers.

For example, the cache memory controlling unit merges the data-to-be-stored in the store data transmitted from the execution unit with existing data-not-to-be-stored that is the data stored in the DATA-RAM corresponding to the area-not-to-be-stored (see (1) in FIG. 15).

In addition, if the write address of the store data currently transmitted from the execution unit makes a match with the write address of preceding store data stored in the WB prior to the store data that is currently received, the cache memory controlling unit merges the data-to-be-stored of the store data transmitted from the execution unit with existing data-not-to-be-stored that is the data stored in the DATA-RAM corresponding to the area-not-to-be-stored and the data-to-be-stored in the preceding store data (see (2) in FIG. 15).

Moreover, if the write address of store data stored in the WB0 makes a match with the write address of store data stored in the WB1, the cache memory controlling unit merges the data-to-be-stored in the store data stored in the WB0 with the data-to-be-stored in the store data stored in the WB1 (see (3) in FIG. 15).

Furthermore, if the write address of the store data currently transmitted from the execution unit makes a match with the write address of store data stored in the WB0 in which the store data currently transmitted from the execution unit is to be stored, the cache memory controlling unit merges data-to-be-stored in the store data transmitted from the execution unit with the existing data-not-to-be-stored that is the data stored in the DATA-RAM corresponding to the area-not-to-be-stored, and the data-to-be-stored in the store data stored in the WB0, and stores the merged data in the WB1 (see (4) in FIG. 15).

Furthermore, upon merging the existing data-not-to-be-stored that is the data stored in the DATA-RAM corresponding to the area-not-to-be-stored with the data-to-be-stored in the store data stored in the WB0 to store the merged data in the WB1 at (4) in FIG. 15, if the write address of the newly generated store data makes a match with the write address of the store data stored in the WB1 into which the newly generated store data is to be stored, the cache memory controlling unit merges the data-to-be-stored in the newly generated store data with the data-to-be-stored stored in the WB1 to store the new store data in the WB1 (see (5) in FIG. 15).

Figure 16:
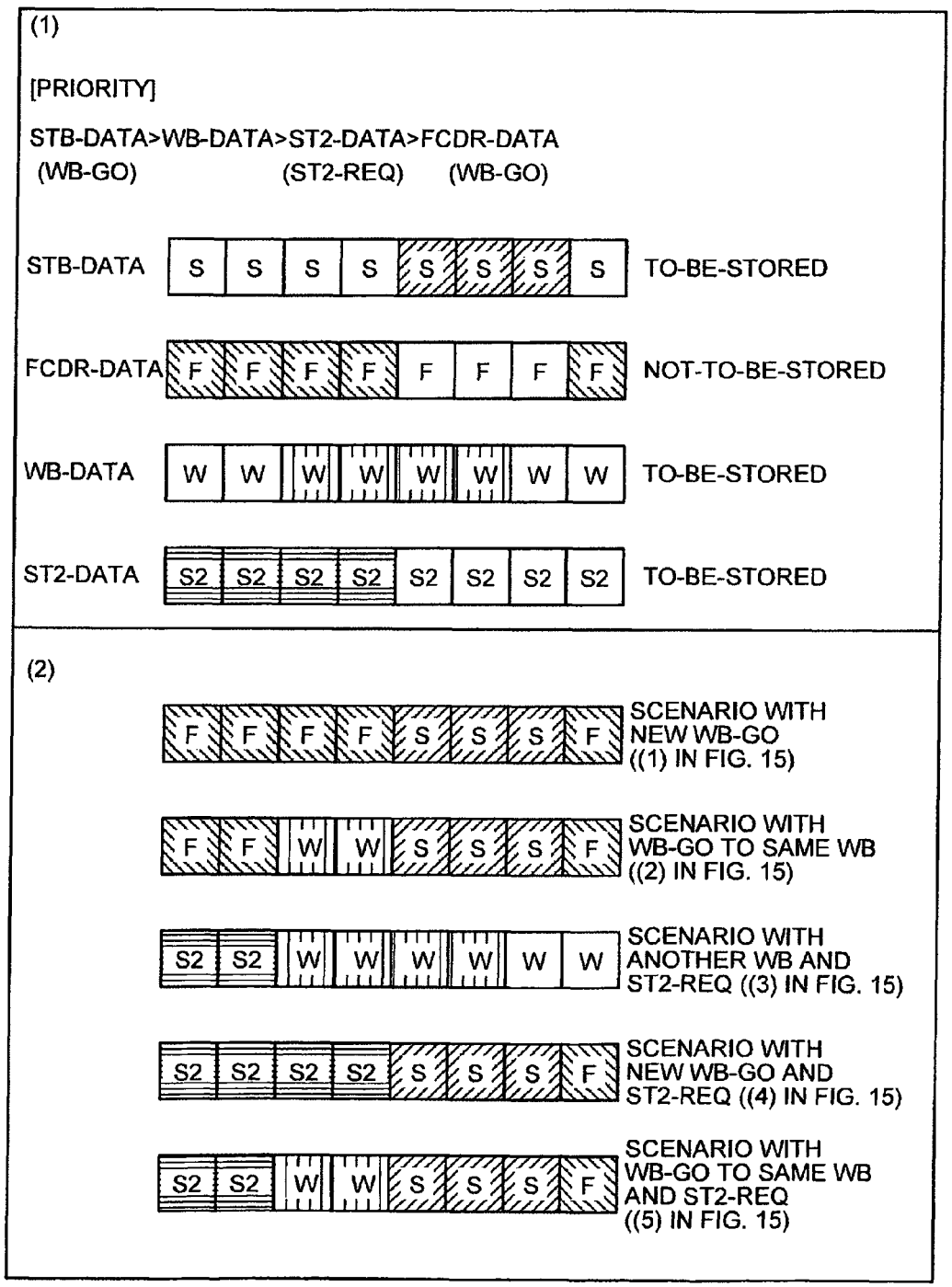
FIG. 16 is a schematic of an example of an order of data priority in a data merger.
Figure 17:
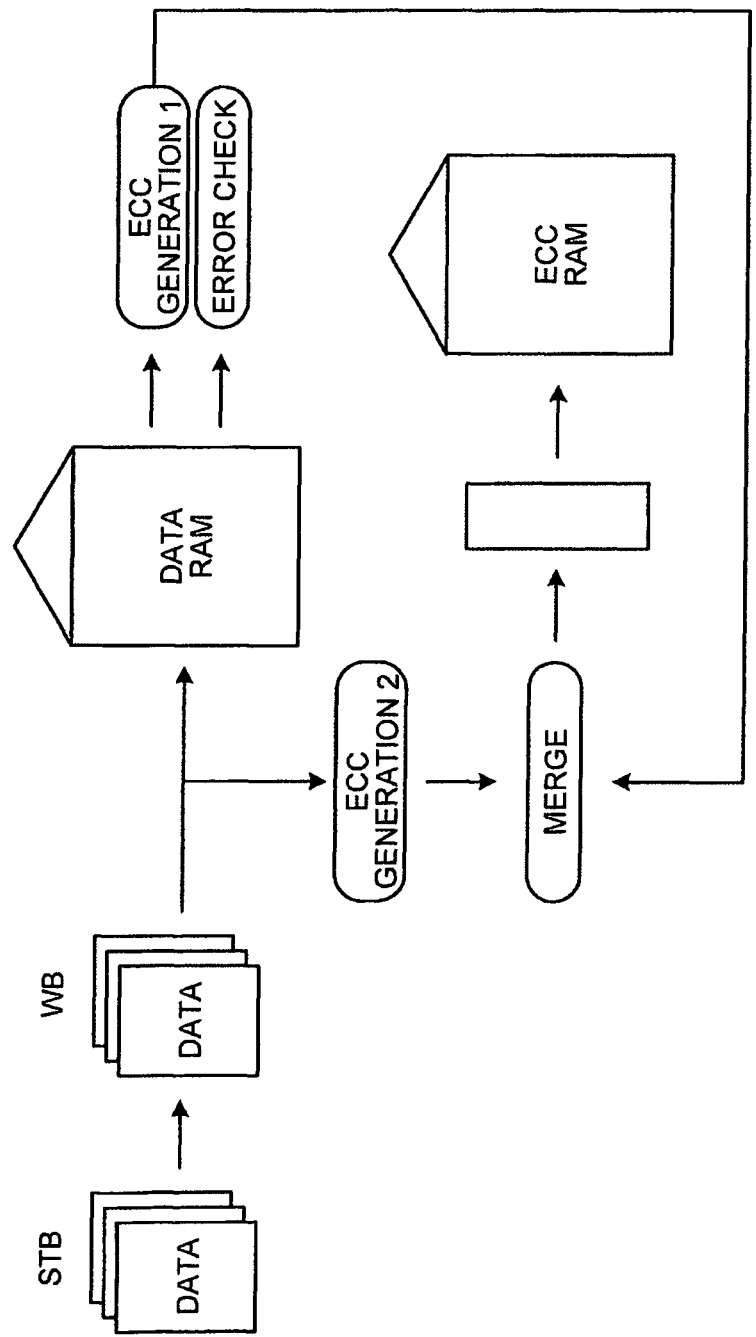
FIG. 17 is a schematic for explaining a conventional technology.
Figure 18:
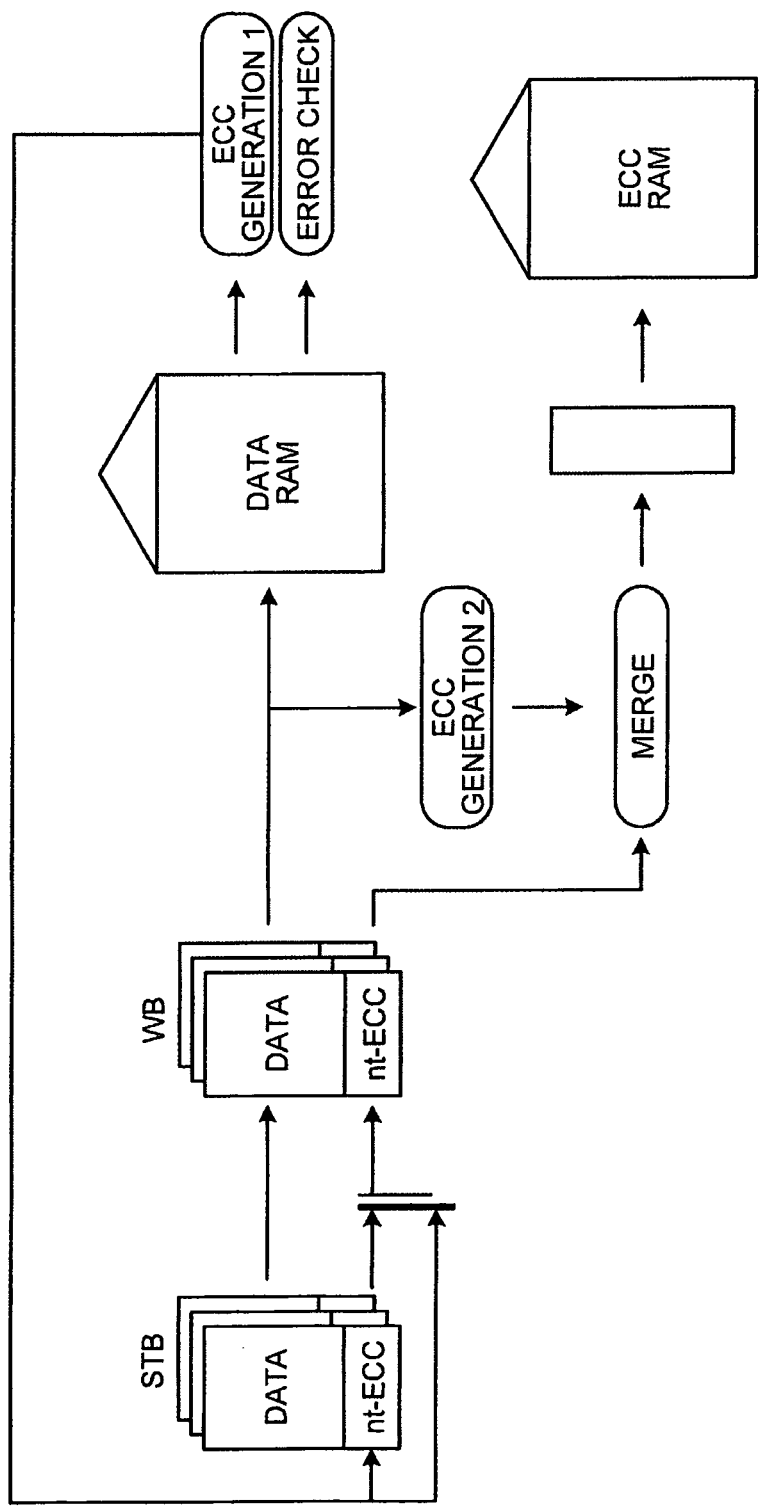
FIG. 18 is another schematic for explaining a conventional technology.

It will now be explained which store data is to be prioritized upon merging the data in the scenarios depicted in (1) to (5) in FIG. 15, with reference to FIG. 16. FIG. 16 is a schematic of an example of an order of data priority in a data merger.

As depicted in (1) in FIG. 16, as an order of data priority in a merger operation, store data to be stored in the "STB-DATA (WB-GO)" is most prioritized, and data to be stored in "WB-DATA", "ST2-DATA (ST2-REQ)", and "FCDR-DATA (WB-GO)" are prioritized in descending order. When this priority is applied to each of the examples depicted in FIG. 15, store data depicted in (2) in FIG. 16 will be generated.

[d] Fourth Embodiment

Up to this point, the embodiments of the present invention have been explained; however, these embodiments may also be realized by various different implementations other than those described above. Therefore, other embodiments of the present invention will now be explained, under the classification of (1) Selecting Data to Be Merged, and (2) System Structure, etc.

(1) Selecting Data to be Merged

In the second embodiment, as an example, it has been explained that the data transmitted by the execution unit is merged with all of the data, including data stored in the DATA-RAM, data found in a retrieval performed after a cache miss, and preceding data; however, the present invention is not limited thereto, and the data to be merged may be selected in any way, e.g., only some of these pieces of data may be merged.

(2) System Structure, Etc.

The whole or a part of the processing described in the embodiments to be automatically executed (e.g., outputting store data from the execution unit) may be manually executed. Moreover, the processing procedure, the control procedure, the specific names, information containing various kinds of data and parameters (for example, those depicted in FIGS. 3 to 5), described herein or in the drawings, may be changed in any way except where specified otherwise.

Furthermore, each of the elements provided in each of the apparatus depicted in the drawings only represents conceptualized functions thereof, and does not necessary have to be structured physically as depicted in the drawings. In other words, a specific distributive or integrative structure of each of the apparatus is not limited to that depicted in the drawings, and whole or any part of thereof may be distributed or integrated functionally or physically in any unit depending on various types of loads or usage (for example, the data detecting unit and the data determining unit may be integrated).

According to an embodiment, it is possible to prevent SSI from occurring even when equal to or less than 8-byte data is stored consecutively to the same address, as well as generating a correct ECC.

Furthermore, according to an embodiment, a correct ECC can be generated even when a cache miss occurs.

Furthermore, according to an embodiment, the cache memory controlling unit can generate new store data and an ECC taking preceding store data into consideration. As a result, SSI can be prevented from occurring more reliably even when equal to or less than 8-byte data is stored consecutively to the same address, and a correct ECC can be generated more surely.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A cache memory controller comprising:
a data detecting unit that detects a write address of a cache memory into which store data is to be stored including first store data to be stored in the cache memory and second store data not to be stored in the cache memory, the data detecting unit holding the first store data in a store buffer, when the store data is transmitted from an execution unit;
a data determining unit that determines whether first existing data to be overwritten by the first store data and second existing data not to be overwritten by the second store data exist in the write address of the cache memory;
an existing data obtaining unit that obtains the second existing data, and holds the obtained second existing data in a fetch register when the data determining unit determines that the second existing data exists in the write address of the cache memory;
a store data writing unit that concatenates the first store data held in the store buffer and the second existing data held in the fetch register to generate concatenated store data, stores the generated concatenated store data in a write buffer and writes the concatenated store data stored in the write buffer into the write address of the cache memory; and
an ECC generating unit that generates an error correcting code of the concatenated store data written in the write address of the cache memory.

2. The cache memory controller according to claim 1, wherein
the cache memory controller registers the first existing data and the second existing data in the write address of the cache memory from a main memory coupled to the cache memory when the data determining unit determines that the first existing data and the second existing data are not present in the write address of the cache memory, and
the data determining unit determines again whether the first existing data and the second existing data exist in the write address of the cache memory after the first existing data and the second existing data are registered by the cache memory controller.

3. The cache memory controller according to claim 1, wherein
the data detecting unit detects a preceding store data preceding the first store data in a write buffer storing a store data,
the store data writing unit concatenates the detected first store data held in the store buffer, the obtained second existing data held in the fetch register and the detected preceding store data to generate another concatenated store data, and writes the other concatenated store data into the write address of the cache memory, and
wherein the ECC generating unit generates an error correcting code of the another concatenated store data written in the write address of the cache memory.

4. A cache memory controlling method comprising:
detecting a write address of a cache memory into which store data is to be stored including first store data to be stored in the cache memory and second store data not to be stored in the cache memory, and holding the first store data in a store buffer when the store data is transmitted from an execution unit;
determining whether first existing data to be overwritten by the first store data and second existing data not to be overwritten by the second store data exist in the write address of the cache memory;
obtaining the second existing data, and holding the obtained second existing data into a fetch register when the determining determines that the second existing data exists in the write address of the cache memory;
concatenating the first store data held in the store buffer and the obtained second existing data held in the fetch register to generate concatenated store data, storing the generated concatenate store data in a write buffer and writing the concatenated store data stored in the write buffer into the write address of the cache memory; and
generating an error correcting code of the concatenated store data written in the write address of the cache memory.

5. The cache memory controlling method according to claim 4 comprising:
registering the first existing data and the second existing data in the write address of the cache memory from a main memory coupled to the cache memory when the determining determines that the first existing data and the second existing data are not present in the write address of the cache memory, and
wherein the determining again determines whether the first existing data and the second existing data exist in the write address of the cache memory after the first existing data and the second existing data are registered at the registering.

6. The cache memory controlling method according to claim 4, wherein
the detecting detects a preceding store data preceding to the first store data in a write buffer storing a store data,
the concatenating concatenates the detected first store data held in the store buffer, the obtained second existing data held in the fetch register and the detected preceding store data to generate another concatenated store data, and writes the other concatenated store data into the write address of the cache memory, and
the generating generates an error correcting code of the another concatenated store data written in the write address of the cache memory.

* * * * *